Nov. 17, 1936.   J. P. BUCKLEY   2,060,974
EDUCATIONAL DEVICE
Filed March 29, 1935   2 Sheets-Sheet 1
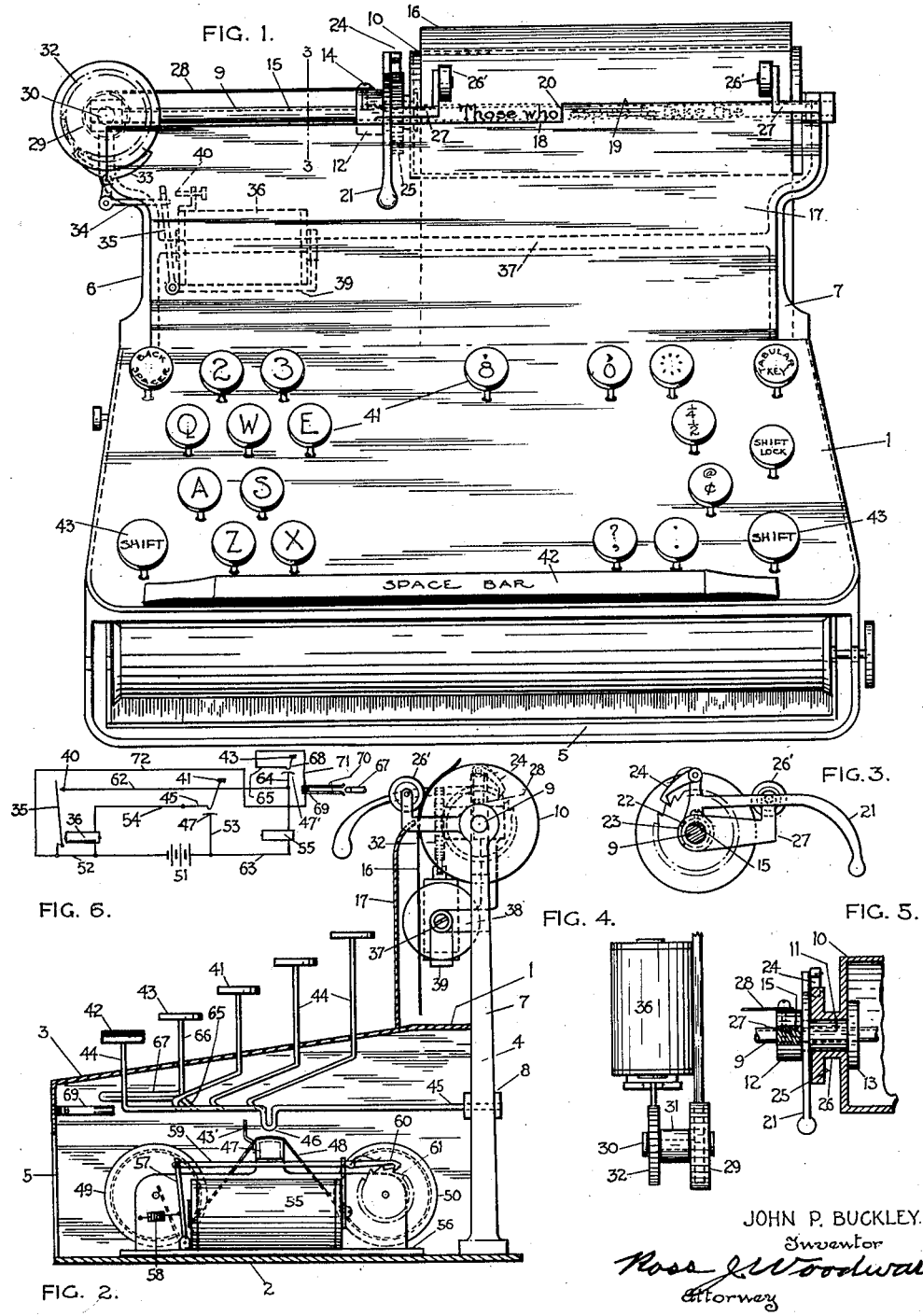
JOHN P. BUCKLEY,
Inventor Nov. 17, 1936.   J. P. BUCKLEY   2,060,974
EDUCATIONAL DEVICE
Filed March 29, 1935   2 Sheets-Sheet 2

JOHN P. BUCKLEY.
Inventor

Patented Nov. 17, 1936

2,060,974

UNITED STATES PATENT OFFICE 2,060,974

EDUCATIONAL DEVICE

John P. Buckley, Washington, D. C.

Application March 29, 1935, Serial No. 14,615

17 Claims. (Cl. 35—5)

This invention relates to an educational device and more particularly to a device by use of which operation of a typewriter or similar machine may be practiced and proper manipulation of the machine quickly and accurately learned.

At the present time expensive typewriters or other machines, the use of which is being taught, are provided in a school for use by students. These machines represent a large investment and in addition are continually in need of repairs due to careless or improper use by the students. This involves additional expense due to repair bills and the fact that an appropriate number of machines must be kept in reserve for use while others are being repaired.

It has also been found that when a student is practising upon a typewriter, keys will be accidentally struck incorrectly and mistakes made when copying a lesson which will not be noticed until the paper is reviewed by the instructor. Therefore, the error is not immediately called to the student's attention and the mistake is liable to be made at frequent intervals when copying lessons.

It has also been found that the student has difficulty in learning the touch system due to the fact that there is nothing to immediately call attention to the fact that the wrong key has been struck and the student will fall into the habit of incorrect fingering.

Another objection to the present method of teaching typewriting is the fact that in a large class the instructor can not give individual attention to each student and therefore quite a long time is necessary in order for a student to learn to correctly and accurately operate the machine.

Therefore, one object of this invention is the provision of a device which may be used for instructing operation of a typewriter without necessitating use of an expensive typewriter and thereby materially reduce the cost of installing machines in a school and also eliminating the cost of repairs.

Another object of the invention is to provide a device for use when practising typewriting which is so constructed that if the wrong key is struck attention of the student will be immediately attracted and the error corrected at once. Therefore, the student will quickly overcome the improper fingering or other cause of the error and will more rapidly learn the proper operation of a typewriter. This is equivalent to an instructor giving individual attention to a student and calling attention to each error as it occurs.

Another object of the invention is to provide a practising device having a key-board which corresponds to the standard key-board of a typewriter, but at the same time eliminates type arms and thereby materially reduces the cost of the device and also eliminates use of paper and typewriter ribbons which are a large item of expense in a school.

Another object of the invention is to provide a machine in which a printed form may be fed into the machine in the same manner in which paper is inserted into a typewriter and this paper moved as the machine is operated to successively expose letters forming words and thus give a very realistic impression that the student is writing upon a sheet of paper and making a copy of a lesson.

Another object of the invention is to provide a machine which will be electrically operated and be controlled by a sheet or strip which moves from one roller to another during operation of the machine but cannot be moved unless the keys are correctly struck.

Another object of the invention is to provide a machine of this character which will be very efficient in operation, strong and durable, and capable of being manufactured at a low cost.

Another object of the invention is to provide a device which will scientifically teach a student how to properly operate a typewriter by the touch system and also be very effective in teaching punctuation, proper forms for use in correspondence, correct paragraphing, reading, spelling, capitalizing of proper names, and thus enable a student to become efficient in a very short time.

The invention is illustrated in the accompanying drawings wherein:

Fig. 1 is a front elevation of the improved instructing machine.

Fig. 2 is a sectional view taken vertically through the machine.

Fig. 3 is a fragmentary sectional view taken along the line 3—3 of Figure 1.

Figure 4 is a view of the mechanism for controlling movement of the carriage.

Figure 5 is an enlarged sectional view of an end portion of the roller and the means for imparting rotation thereto.

Figure 6 is a wiring diagram.

Figure 7:
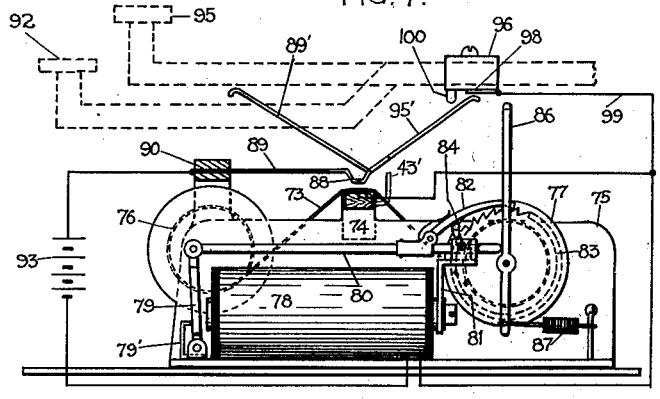
Figure 7 is a fragmentary view in elevation of a modified construction.
Figure 9:
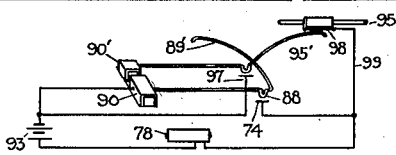
Figure 9 is a diagram of the wiring in Figures 7 and 8.

This invention has been illustrated as a machine for the teaching and practice of typewriting, but it is to be understood that the invention could be embodied in a machine for teaching use of a calculating machine such as an adding machine, for teaching use of a typesetting machine or linotype machine, or any other machine which is operated through the medium of a key-board.

The frame 1 of this machine is in the form of a hollow casing formed of sheet metal and having a bottom 2, a top or upper wall 3, and side walls 4. A front opening 5 is provided to permit access to the interior of the casing from the front thereof and the back may be open if desired or closed, but is preferably closed by a rear wall constituting a mounting for the keys and space bar of the key board. Standards 6 and 7 formed of cast metal or stamped sheet metal extend vertically at opposite sides of the rear end of the frame or casing 1 and as the casing is open at its back a cross bar 8 will extend between the standards to serve as a mounting for the keys and space bar. Sleeves are formed at upper ends of the standards and in these sleeves are engaged ends of a bar or shaft 9 upon which a roller 10 is slidably and rotatably mounted. One end portion of the roller fits loosely about a sleeve or bushing 11 between heads 12 and 13, the head 12 being formed with a radially extending threaded opening to receive a screw 14 which engages in a key-way or groove 15 formed longitudinally in the shaft and preventing the sleeve from turning about the shaft. It will thus be seen that the roller may be moved transversely across the frame similar to the manner in which the carriage of a typewriter moves when in use and may also be rotated to shift a sheet of paper 16 upwardly and successively move lines of writing on the paper into position at the upper end of the shield 17. The shield is formed of sheet metal and rises vertically from the top wall of the casing in front of the roller with the upper end terminating midway the depth of the roller. The upper edge of the shield has portions 18 and 19 offset vertically relative to each other and therefore a vertical edge 20 will be formed and when the machine is in use letters forming words of a line of typewriting will progressively move across the edge 20 of the shield into view and it will appear that the operator of the machine is actually writing the words as they appear.

After a line has been "written" a lever 21 corresponding to the usual roller operating lever of a typewriter will be grasped and operated to rotate the roller a distance corresponding to the space between lines of typewriting upon the paper and the roller shifted along the shaft to the starting position at the right hand side of the typewriter. This lever fits loosely about the sleeve 11 and has rocking movement thereon which is limited by a screw 22 engaged through an arcuate slot 23 formed in the hub portion of the lever. A pawl 24 which is pivoted to the lever and engages teeth of a ratchet wheel 25 carried by the neck 26 of the roller imparts a step by step rotation to the roller as the lever is actuated. Therefore, the paper will be properly shifted vertically and the roller shifted transversely across the frame of the machine each time the lever is actuated. Small rollers 26' serving as paper guides and holding the paper in proper contact with the roller 10 are carried by arms 27, one of which is carried by the head 12 and the other by the standard 7.

Movement is imparted to the roller toward the left along the shaft 9 by a spring tape 28 wound upon a drum 29 having a shaft 30 journaled through a bearing 31 at the upper end of the standard 6 and to this shaft is fixed a ratchet wheel 32 engaged by an escapement pawl 33 which is pivoted to the standard and carries an arm 34 engaged by the armature 35 of a relay or electromagnet 36. The relay is supported upon a bar 37 carried by arms 38 projecting forwardly from the standards and the armature is pivoted to a yoke or support 39 which is also supported by the bar 37 and extends under the relay longitudinally thereof.

When the electro-magnet is energized the armature will be attracted and the escapement operated to permit rotation of the drum and draw upon the roller to shift the roller along the shaft a distance corresponding to one letter or a space between words in a line of typewriting and, therefore, the letters and words will successively move past the vertical edge of the shield into view. After a line has been written the roller will be returned to its position at the right hand side of the frame and the spring will be rewound. A contact 40 is carried by the relay and is engaged by the armature each time the armature is drawn towards the magnet.

A circuit through the electro-magnet 36 is controlled by writing keys 41, which correspond in number and disposition to the keys of a standard typewriter key board, and also by a space bar 42 and shift keys 43. The writing keys and space bar are carried by arms or shanks 44 formed of resilient material which extend vertically through openings formed in the top wall of the casing 1 and within the casing are bent to provide horizontal portions 45 carried by the cross bar 8 or rear wall of the casing. Intermediate its length each horizontal portion is crimped to form a depending finger 46 for engagement with a contact bar 47 which extends transversely in the casing and constitutes a track over which passes a ribbon 48 formed of paper or other insulating material. This ribbon or paper strip is similar to those used for mechanical pianos and typewriters and travels from the roller or spool 49 to the roller or spool 50 when the machine is in operation. As the ribbon is formed with perforations, portions of the contact bar will be individually and successively exposed as the ribbon passes across it and as the contact bar and relay are connected with opposite sides of a source of power 51 by wires 52 and 53 and the keys and space bar are connected with the relay by a conductor 54, a circuit will be completed through the relay whenever a finger 46 makes contact with the bar through an opening of the ribbon. Unless an opening of the ribbon is under a finger which is depressed the finger can not make contact with the bar and therefore the relay will not be energized unless the correct key is struck. It will thus be seen that the operator must strike the correct keys in order to cause the roller 10 to be shifted towards the left and if the wrong key is struck or the operator forgets to strike the space bar between words his attention will be immediately called to the error by the machine failing to operate. Therefore, the student will quickly learn to strike the proper keys when copying a form sheet which will be of the type usually supplied in schools and is a duplicate of the paper 16. As the printed form used as a lesson is a duplicate of the sheet 16 and the ribbon is punched to conform to both sheets, the student can look at the form sheet and operate the machine by striking the keys and space bar in the usual manner. The letters of the sheet move from behind the screen or shield 17 as the correct keys are struck and a very realistic impression is given that words are being typed upon the sheet 16 by the student.

When the correct key is struck and the roller 10 shifted toward the left the ribbon 48 must also be shifted across the contact bar to bring the next perforation into place over the bar. This is accomplished by an electro-magnet 55 mounted upon a carriage or frame 56 which also supports the contact bar. The armature 57 of the magnet 55 is yieldably held away from the magnet by a spring 58 and is attached to a strip 59 mounted for reciprocating movement longitudinally of the magnet and carrying a pawl 60 which engages a ratchet wheel 61 fixed to the spool 50. Wires 62 and 63 lead from the magnet 55 to the contact 40 and battery 51 and from an inspection of the diagram illustrated in Figure 6 it will be readily seen that when the armature of the battery 36 engages the contact 40 a circuit will be completed through the magnet 55 and the spool 50 rotated to shift the ribbon across the contact bar. The keys are released as soon as they are struck and return to a raised position and, therefore, contact of the fingers 47 with the contact bar will be immediately broken and the circuits opened to release the armatures and permit the armatures and pawls to return to their normal positions. It will thus be seen that each time the correct key or the space bar is struck the roller 10 will be shifted and the ribbon also moved to bring another opening into place over the contact bar but if the keys are not correctly operated and mistakes made the circuit cannot be closed and the student's attention will be instantly attracted.

When a capital letter is to be used the shift key may be depressed and so held while the letter key to be capitalized is struck. The ribbon is formed with an opening through which contact with the bar must be made when the shift key is depressed and the ribbon must be shifted while the shift key is depressed in order that the finger of the letter key to be capitalized may make contact with the bar. Therefore, the magnet 55 must be energized twice when a capital letter is formed. In order to do so the bar 47 has been provided under each shift key with an auxiliary portion 47' which is insulated from the remainder of the bar and connected with the wire 62 by a wire 64. The horizontal portion 65 of the arm 66 of the shift key is bent back upon itself to form a contact blade 67, and intermediate its length this horizontal portion is formed with a finger 68 corresponding to the fingers 46 and disposed in position for engaging the contact 47' as shown in Figure 6. A two-blade contact 69 which has its blades 70 insulated from each other has one blade connected with the shift key by a wire 71 and its other blade connected with the battery by a wire 72 at the other side of the battery from the wire 63. The switch 69 is mounted at the front of the casing in position for the blade 67 to pass between the blades 70 in contact therewith during depression of the shift key and, therefore, when the shift key is struck to move its finger 68 into engagement with the contact 47', a circuit through the magnet 55 will not be completed until the blade 67 moves between the blades 70. As the shift key is completely depressed the blade 67 moves downwardly away from contacts 70 and the circuit will be broken so that the spring 58 can return the armature to its normal position and shift the ribbon and bring the proper letter perforation into place over the contact bar. The horizontal portion of the shift key rocks across the fulcrum 43', as the blade 67 moves downwardly from the blades 70 to raise the finger 68 and permit the paper to slide freely. If it is attempted to write a letter which is to be capitalized without first depressing the shift key the letter perforation will not be in position for the contact arm 46 of the letter key to pass through it and therefore the roller 16 will not be shifted and cause the capital letter to appear. As the blade 67 moves upwardly and again passes between the blades 70, when pressure upon the shift key is relieved after a capital letter has been written a circuit will not be established through the magnet as the paper ribbon will be between the arm 68 and the contact 47' and a complete circuit cannot be established. It will thus be seen that with this machine the student will learn to operate the shift key properly as well as the letter key and will soon learn to accurately and correctly operate a typewriter without the personal attention of an instructor.

Figure 8:
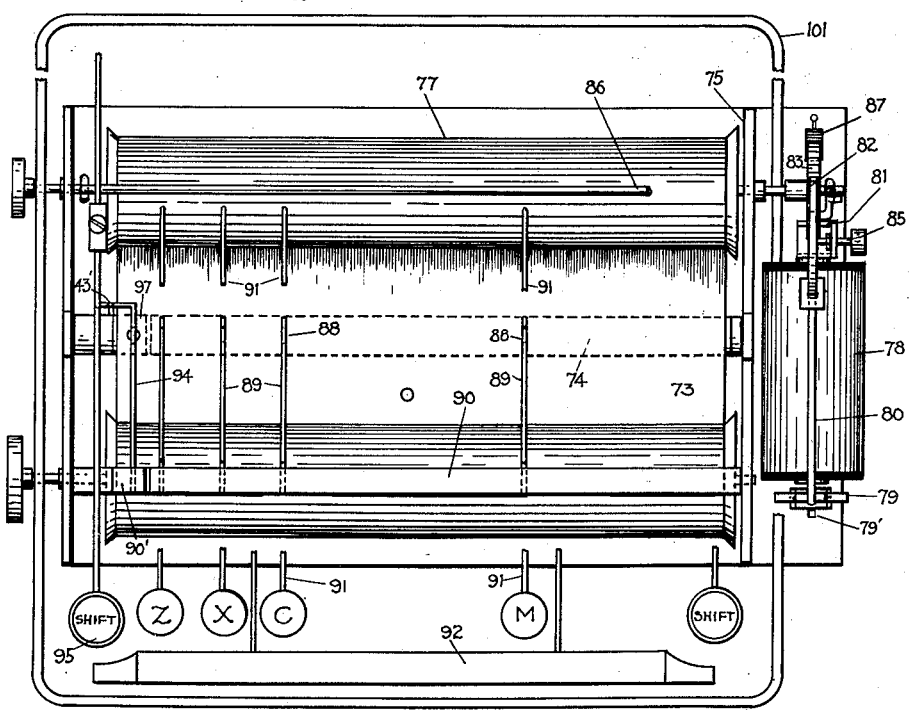
Figure 8 is a top plan view of the construction shown in Figure 7.

In the embodiment of the invention illustrated in Figures 7 and 8, the device illustrated is to be used with a typewriter of a conventional construction and is set in place under the keyboard as an accessory. A ribbon 73 corresponding to the ribbon 48 passes over a contact bar 74 carried by a frame 75 and moves from the spool 76 to the spool 77 during operation of the machine. An electro-magnet 78 is mounted at one side of the frame and is provided with an armature 79 pivoted to a rod 80 which extends over the magnet longitudinally thereof with its free end portion slidably engaged through a guide bracket 81. A pawl 82 is pivoted to the rod 80 and yieldably held in engagement with a ratchet wheel 83 carried by the shaft of the spool 77 so that as the rod is shifted longitudinally and then permitted to return to its original position in which the armature rests against the stop 79' the spool will be successively rotated by a step by step motion. A finger or cam 84 is carried by a shaft 85 and by turning the shaft through the medium of the knob at its outer end the cam may be shifted toward the pawl and the pawl manually moved out of engagement with the ratchet wheel in case it is desired to rotate the spool independent of the electro-magnet. The rod 80 serves not only as a carrier for the pawl but also as a reciprocating element for engaging the bridge or yoke 86 and moving the bridge out of a vertical position. The bridge is normally held in the vertical position by a spring 87 where it yieldably holds the armature away from the magnet and also serves to prevent undesired downward movements of the keys but when the correct key is struck the bridge will be swung downwardly and the type bar controlled by the key will be shifted into position to print a letter upon a sheet of paper in the carriage of the typewriter. It will thus be seen that an advanced student using a regular typewriter will be prevented from making mistakes. The device may also be used by beginners for self-instruction and in schools already equipped with typewriters.

In this form of machine an electro-magnet and related parts corresponding to the electro-magnet or relay 36 is not needed as the typewriter will be equipped with the regular carriage and roller. It is merely necessary to provide the electro-magnet 78 for intermittently imparting movement to the spool 77 and thus causing the ribbon 73 to be shifted across the contact bar 74 and dispose openings in the ribbon in position to expose portions of the contact bar for engagement by the fingers or extensions 88 of the contact strips 89 carried by the metallic bar 90 which extends transversely across the frame 75 and is insulated therefrom. These strips are formed of strands of resilient material and each has an upwardly extending end portion 89' directly under an arm of a type key 91 of the typewriter or an arm of the space bar 92 of the typewriter and from an inspection of Figure 7 it will be readily seen that when the space bar or a key under which an opening of the ribbon is disposed is struck engagement of the finger of the contact strip which is forced downwardly by the depressed key or space bar will close a circuit through the magnet 78 and cause the rod 80 to be shifted longitudinally to rotate the spool 77 and also swing the bridge 86 rearwardly to a position in which the key may be fully depressed and the type bar moved to form an impression of its letter upon a sheet of paper in the typewriter. If the wrong key is struck the key bar will strike the bridge and prevent the key from being depressed a sufficient distance to cause a letter to be impressed upon the paper. The contact strip 94 which cooperates with the shank or arm of the shift key 95 and is carried by an insulated portion 90' of the bar 90 is somewhat different in shape from the contact strips 89 and has an upwardly extending end portion 95' disposed under a sleeve 96 carried by the shank of the shift key. The finger of this contact strip is disposed over an insulated portion 97 of the bar 74 and when the shift key is depressed the cooperating contact strip makes contact with the insulated portion of the contact bar and with the terminal 98 of a wire 99 leading from the circuit of the electromagnet. A lug 100 projecting downwardly from the sleeve then engages the free end portion of the contact strip and moves it away from the terminal 98 so that the circuit will be opened and release the armature of the magnet so that it may return to its normal position and permit the ribbon to be again shifted when the key of a letter to be capitalized is struck. Movement of the ribbon to cover the portion of the contact bar under the finger of the strip 95 will prevent closing of the circuit as the shift key is released and moves upwardly. The frame of the typewriter is indicated by 101.

It will thus be seen that the invention may be incorporated in a machine constituting an instructing device in itself or as an accessory to be applied to a typewriter of a conventional construction and disposed under the key board thereof when in use.

Having thus described the invention, what is claimed is:

1. The combination with a machine including a key board and a paper carrier shiftable transversely of the machine, of means for controlling movement of the carrier in one direction including an electro-magnet, a circuit for said magnet including a stationary contact, contacts movable toward the stationary contact when keys of the key-board are depressed, and a strip of insulating material movable between the stationary contact and movable contacts and formed with openings to successively expose portions of the stationary contact under predetermined movable contacts as the strip is moved across the stationary contact.

2. The combination with a machine including a key board and a paper carrier shiftable transversely of the machine, of means for controlling movement of the carrier in one direction including an electro-magnet, a circuit for said magnet including a contact bar and movable contacts adapted to be moved into engagement with the contact bar when keys of the key-board are depressed, a strip of insulating material movable across the contact bar and formed with openings for successively exposing portions of the contact bar under predetermined movable contacts as the strip is moved across the contact bar, and means for controlling movement of said strip actuated from said magnet.

3. In a device of the character described, the combination with a key-board, of means for controlling manipulation of keys of the key-board including an electric circuit maker and breaker having a stationary contact bar and movable contacts individually movable towards the contact bar when keys of the key board are depressed, insulating material movable across the contact bar and having openings for exposing portions of the bar under predetermined keys as the insulating material is moved across the bar, and means for imparting movement to the insulating material including an element energized when a movable contact engages the contact bar.

4. In a device of the character described, the combination with a key-board, of means for controlling manipulation of keys of the key-board including an electric circuit maker and breaker having a stationary contact and movable contacts adapted to be each operated by a key of the key-board and individually moved towards the stationary contact when the cooperating key is depressed, spools, a strip of insulating material movable from one spool to the other and extending across the stationary contact and having openings arranged for successively exposing portions of the stationary contact under predetermined movable contacts as the strip is moved across the stationary contact, and means for controlling movement of said strip consisting of an electro-magnet, an armature for said magnet, a pawl actuated by movement of the armature, a ratchet wheel carried by one spool and engaged by said pawl for imparting step by step rotation of the spool when the magnet is energized by engagement of a movable contact with the stationary contact.

5. In a device of the character described, the combination with a key-board, of means for controlling manipulation of keys of the key-board including an electric circuit maker and breaker having a stationary contact and movable contacts disposed under keys of the key-board and individually movable towards the stationary contact when keys over them are depressed, spools rotatably mounted, a strip of insulating material movable from one spool to the other and extending across the stationary contact, an electromagnet in circuit with the stationary and movable contacts, openings being formed in said strip for successively exposing portions of the stationary contact under predetermined movable contacts as the strip is moved across the stationary contact, and means actuated by energizing of the magnet for imparting step by step rotation to one spool and effecting movement of the strip.

6. In a device of the character described, the combination with a keyboard, of means for controlling manipulation of keys of the key-board including an electric circuit maker and breaker having a stationary contact and movable contacts each actuated by a key of the key board and individually movable towards the stationary contact when the cooperating key is depressed, spools rotatably mounted, a strip of insulating material movable from one spool to the other and extending across the stationary contact, an electro-magnet in circuit with the stationary and movable contacts, openings being formed in said strip for successively exposing portions of the stationary contact under predetermined movable contacts as the strip is moved across the stationary contact, an armature for said magnet, a rod connected with said armature and slidably mounted, a pawl carried by said rod, a ratchet wheel carried by one spool and engaged by said pawl, and an element for controlling depression of the keys yieldably held in position for preventing complete depression of the keys and moved out of a normal position to permit complete depression of the keys when a circuit is closed through the magnet and said rod is shifted to impart rotation to the spool.

7. In a device of the character described, the combination with a key-board, of means for controlling manipulation of the key-board including an electric circuit maker and breaker having a stationary contact and movable contacts each actuated by a key of the key board and individually movable towards the stationary contact when the cooperating key of the key board is depressed, spools rotatably mounted, a strip of insulating material extending across the stationary contact and movable from one spool to the other, an electro-magnet in circuit with the stationary and movable contacts, openings being formed in the strip for successively exposing portions of the stationary contact under predetermined movable contacts as the strip moves across the stationary contact, an armature for said magnet, a rod pivoted to said armature and extending longitudinally of the magnet, a ratchet wheel carried by said spool, a pawl pivoted to said rod and yieldably held in engagement with the ratchet wheel, a bridge having arms and a cross bar connecting upper ends thereof, the arms being pivoted to swing about the axis of the ratchet wheel and yieldably held in an upright position with the cross bar extending under keys transversely thereof in position to prevent complete depression of the keys, the rod when shifted by energization of the magnet having one end moved into engagement with an arm of the bridge downwardly to swing the bridge out of an upright position and permit complete depression of the keys.

8. The combination with a key board including keys one of which is a shift key, of means for controlling manipulation of the keys including an electro-magnet, an electric circuit maker and breaker having a stationary contact and movable contacts adapted to be moved towards the stationary contact when keys other than the shift key are depressed, an auxiliary stationary contact, a movable contact cooperating with the auxiliary contact and moved towards the same when the shift key is depressed, a strip of insulating material movable across the stationary contact and formed with openings for exposing portions of the stationary contact under predetermined movable contacts as the insulating material moves across the stationary contact, means for imparting movement to the insulating strip controlled by opening and closing of the circuit, and means for closing the circuit and then breaking the circuit when the shift key is depressed whereby the insulating strip will be moved into position in which a portion of the contact bar under a key to be capitalized will be exposed.

9. In a device of the character described, a platen-like carriage, means to slidably and rotatably mount said carriage, spring actuated means for sliding the carriage in one direction having an escapement for controlling operation thereof, a key-board, a relay having connection with the escapement to operate the same and effect a step by step movement of the carriage, an electro-magnet in circuit with the relay energized when the relay is energized, a stationary contact, movable contacts each actuated by a key of the key board and individually moved to engage the stationary contact when its actuating key of the key board is depressed, insulating means movable across the stationary contact and formed with openings for successively exposing portions of the stationary contact under predetermined movable contacts as it moves across the stationary contact, and means for controlling movements of the insulating means controlled by the electro-magnet, whereby the carriage only moves longitudinally when the operator actuates keys to make a duplicate copy of a lesson sheet.

10. In a device of the character described, a frame, a roller rotatably mounted and slidable transversely of the frame, keys carried by the frame and arranged as a key board in front of the roller, a stationary contact, movable contacts each adapted to be actuated by a key of the key board and individually moved to engage the stationary contact as its cooperating key is manipulated, an insulating strip movable across the stationary contact and formed with openings for exposing portions of the stationary contact under predetermined movable contacts as it moves across the stationary contact, a relay for controlling sliding movement of said roller in circuit with the contacts, and means for imparting step by step movements to the insulating strip including an electro-magnet in circuit with and controlled by said relay.

11. In a device of the character described, a frame, a key board, a shield rising vertically of the key board and having upper edge portions offset vertically, a lesson-carrying roller back of said shield slidable transversely of the frame and having a portion of a lesson carried by the roller progressively exposed at the offset portion of the shield as the roller is moved longitudinally, means for imparting step by step sliding movement to the roller including a spring drum and an escapement, a relay having an armature engaging the escapement and effecting sliding movement of the roller when the relay is energized, a circuit for the relay including circuit making and breaking means actuated by keys of the key board, an insulating strip movably mounted and cooperating with the circuit maker and breaker, and means for controlling movement of the insulating strip including an electro-magnet in circuit with and controlled by said relay whereby the roller and a lesson carried thereby only move longitudinally when the operator actuates keys to make a duplicate copy of a lesson sheet.

12. In a device of the character described, a frame having standards at its rear disposed at opposite sides of the frame, a shaft carried by said standards, a lesson-carrying roller rotatable about and slidable along said shaft, a key-board in front of said standards, a shield rising from the frame back of the keyboard and disposed in front of the roller, said shield having upper edge portions offset vertically whereby a portion of a lesson carried by the roller will be progressively exposed during sliding movement of the roller, means for effecting step by step sliding movement of the roller including a spring drum carried by one standard with its spring connected with the roller, an escapement cooperating with the spring drum, a relay having its armature in operative engagement with said escapement, a circuit for the relay including a circuit maker and breaker having a stationary contact and a plurality of movable contacts associated with and individually moved by companion keys of the keyboard, spools rotatably mounted with the stationary contact between the spools, a strip of insulating material extending across the stationary contact from one spool to the other and formed with openings to successively uncover portions of the stationary contact under predetermined movable contacts as the strip is moved, and means for rotating one spool and imparting step by step rotation to said strip including an electro-magnet in circuit with and controlled by said relay, whereby the roller and a lesson carried thereby only move longitudinally when the operator actuates the keys to make a duplicate copy of a lesson sheet.

13. In a device of the character described, a casing having a top wall, keys disposed in key-board formation over the top wall and having shanks extending vertically through the top wall and mounted to yieldably resist depression of the keys, contact fingers carried by the portions of the shanks under the top wall, a contact bar extending transversely in said casing under said fingers for individual engagement thereby when the keys are depressed, a strip of insulating material extending across the contact bar, spools for carrying said strip rotatably mounted in the casing, a pawl and ratchet for one spool, an electro-magnet having its armature connected with said pawl, a relay in circuit with the electro-magnet, a lesson-carrying roller slidable transversely of the casing above the same, and means for imparting step by step sliding movement to the roller including an escapement controlled by the armature of the relay, whereby the roller and a lesson carried thereby only move longitudinally when the operator actuates the keys to make a duplicate copy of a lesson sheet.

14. In a device of the character described, a casing, standards rising from the casing, a bar carried by said standards and extending transversely of the casing, a carriage slidable along said bar and having a lesson-carrying roller rotatable about the bar, a spring drum carried by one standard, a spring wound upon said drum and connected with said carriage, an escapement for controlling rotation of said drum and effecting a step by step sliding movement of the carriage, a relay having an armature engaging the escapement for actuating the escapement when the relay is energized, a circuit for the relay including a contact bar extending transversely in said casing, a frame supporting said contact bar, spools carried by said frame, a strip of insulating material extending across the contact bar and wound upon said spools, keys having shanks extending into said casing and mounted to yieldably resist depression of the keys, said shanks having portions bent to form depending contact fingers for individually engaging the contact bar when the keys are depressed, the contacts being in circuit with the relay, an electro-magnet in circuit with the relay, a ratchet wheel carried by one spool, a pawl yieldably held in engagement with the ratchet wheel, and a rod pivoted to the armature of the electro-magnet and extending longitudinally of the magnet and pivotally connected to said pawl, whereby the carriage and a lesson carried by the roller only move longitudinally when the operator actuates the keys to make a duplicate copy of a lesson sheet.

15. In a device of the character described, a casing, a lesson-carrying roller rotatably and slidably mounted over said casing, a shield rising from the casing in front of said roller and having upper edge portions offset vertically from each other and joined by a vertically extending edge, keys arranged in key-board formation in front of said shield, one of the keys being a shift key, each key having a shank extending into the casing and mounted to yieldably resist depression of the key, means for effecting a step by step sliding of the roller longitudinally of the upper end of the shield whereby a portion of a lesson carried by the roller will be progressively exposed from behind the shield during sliding movement of the roller, said means including an escapement and a relay for operating the escapement, a contact bar in said casing constituting a stationary contact, an auxiliary stationary contact carried by and insulated from said contact bar, contact fingers carried by the shanks of the keys with the finger of the shift key over the auxiliary stationary contact and the fingers of the other keys over the contact bar, a contact blade extending from the shank of the shift key, companion switch blades insulated from each other and bridged by the contact blade when the shift key is depressed, spools rotatably mounted in said casing, a strip of insulating material passing over the contact bar and auxiliary contact from one spool to the other and formed with openings for exposing portions of the stationary contacts as the insulating strip moves across the contact bar, and means for controlling rotation of the spools including an electro-magnet in circuit with said relay, the contacts and blades being in circuit with the relay and electro-magnet for controlling energizing thereof, whereby the roller and a lesson carried thereby will only move longitudinally when the operator actuates the keys to make a duplicate copy of a lesson sheet.

16. In combination with a machine including a key board and a paper carrier shiftable transversely of the machine, means for controlling movement of the carrier including an electrically energized operating element, a circuit maker and breaker electrically associated with the operating element and adapted to be closed by keys of the key board to energize the operating element when the keys are moved in an operating direction, and means for controlling opening and closing of a circuit through the operating element and the circuit maker and breaker movable between elements of the circuit maker and breaker and having insulating portions and other portions permitting flow of current from one element of the circuit maker and breaker to another when between the same whereby a circuit may be closed only when predetermined keys of the key board are moved in the operating direction.

17. In combination with a machine including a key board and a paper carrier shiftable transversely of the machine, means for controlling movement of the carrier including an electrically energized operating element, a circuit maker and breaker electrically associated with the operating element and adapted to be closed by keys of the key board to energize the operating element when the keys are moved in an operating direction, means for controlling opening and closing of a circuit through the operating element and the circuit maker and breaker movable between elements of the circuit maker and breaker and having insulating portions and other portions permitting flow of current from one element of the circuit maker and breaker to another when between the same whereby a circuit may be closed only when predetermined keys of the key board are moved in the operating direction, and a shield in front of said paper carrier having transverse edges joined by a vertical edge and stepped to dispose one in a higher plane than the other whereby as the carrier moves a line of data extending transversely upon a sheet of paper carried by the paper carrier will progressively move from a concealed position behind the shield into position to be seen.

JOHN P. BUCKLEY.